US012464974B2

(12) United States Patent
do Amaral Assy et al.

(10) Patent No.: US 12,464,974 B2
(45) Date of Patent: Nov. 11, 2025

(54) SEED CAPTURE DEVICES FOR SEED METERS AND RELATED SYSTEMS

(71) Applicant: Jose Roberto do Amaral Assy, Caldas Novas (BR)

(72) Inventors: Jose Roberto do Amaral Assy, Caldas Novas (BR); Claudio Chiba Kawasaki, Sao Paulo (BR); Duceni Alves de Souza, Diadema (BR); Paulo Ricardo da Silva Pereira, Sao Paulo (BR)

(73) Assignee: Jose Roberto Assy, Caldas Novas (BR)

( * ) Notice: Subject to any disclaimer, the term of this patent is extended or adjusted under 35 U.S.C. 154(b) by 84 days.

(21) Appl. No.: 18/243,813

(22) Filed: Sep. 8, 2023

(65) Prior Publication Data

US 2023/0413719 A1    Dec. 28, 2023

Related U.S. Application Data

(62) Division of application No. 16/751,095, filed on Jan. 23, 2020, now Pat. No. 11,839,175.

(30) Foreign Application Priority Data

Jan. 23, 2019    (BR) ..................... 10 2019 001328 1

(51) Int. Cl.
*A01C 7/12* (2006.01)
*A01C 7/20* (2006.01)
*A01C 19/02* (2006.01)

(52) U.S. Cl.
CPC ................ *A01C 7/127* (2013.01); *A01C 7/20* (2013.01); *A01C 19/02* (2013.01)

(58) Field of Classification Search
CPC .......... A01C 7/046; A01C 7/127; A01C 7/128; A01C 7/20; A01C 19/02
See application file for complete search history.

(56) References Cited

U.S. PATENT DOCUMENTS

| 2016/0100519 A1 | 4/2016 | Noer |
| 2016/0128267 A1 | 5/2016 | Garner |
| 2016/0227700 A1 | 8/2016 | Wendte |
| 2019/0098828 A1 * | 4/2019 | Wilhelmi ................ A01C 7/16 |
| 2020/0000010 A1 | 1/2020 | Jagow |

(Continued)

FOREIGN PATENT DOCUMENTS

| AU | 2014312034 A1 * | 3/2016 | .......... A01C 7/0445 |
| CN | 102763507 A * | 11/2012 | |

(Continued)

OTHER PUBLICATIONS

United States Patent and Trademark Office, Final Office Action, for U.S. Appl. No. 16/751,095, mailed Oct. 14, 2022; 11 pages.

(Continued)

*Primary Examiner* — Christopher J. Novosad
(74) *Attorney, Agent, or Firm* — Greenberg Traurig, LLP

(57) ABSTRACT

Seed capture devices for a seed meter may include a seed a movable element configured to capture seeds from a seed disk of a seed meter and a power transmission element operably coupled to the movable element to drive the movable element when the seed meter is in operation and operably coupled to a mechanical contact element of the seed disk of the seed meter to drive the power transmission element when the seed meter is in operation.

5 Claims, 15 Drawing Sheets

(56) References Cited

U.S. PATENT DOCUMENTS

2020/0000016 A1  1/2020  Hubner
2022/0159902 A1  5/2022  Godart

FOREIGN PATENT DOCUMENTS

| CN | 104956815 A | 10/2015 |
|----|-------------|---------|
| WO | 2015031840 A1 | 3/2015 |
| WO | 2020014752 A1 | 1/2020 |
| WO | 2020051652 A1 | 3/2020 |

OTHER PUBLICATIONS

United States Patent and Trademark Office, Non-Final Office Action, for U.S. Appl. No. 16/751,095, mailed Feb. 6, 2023; 9 pages.
United States Patent and Trademark Office, Non-Final Office Action, for U.S. Appl. No. 16/751,095, mailed Jun. 10, 2022; 10 pages.
United States Patent and Trademark Office, Notice of Allowance for U.S. Appl. No. 16/751,095, mailed Jul. 6, 2023, 5 pages.

\* cited by examiner

SEED CAPTURE DEVICES FOR SEED METERS AND RELATED SYSTEMS

CROSS REFERENCE TO RELATED APPLICATION

This application is a divisional of U.S. patent application Ser. No. 16/751,095, titled "SEED CAPTURE DEVICES FOR SEED METERS AND RELATED SYSTEMS," filed 23 Jan. 2020, which claims the benefit of Brazilian Patent Application No. BR 10 2019 001328 1, titled "DISPOSITIVO DE CAPTURA DE SEMENTES PARA DOSADOR DE SEMENTES, SISTEMA DE SINGULARIZAÇÃO E DISPENSAÇÃO DE SEMENTES E SISTEMA DE SINCRONIZAÇÃO DE MEIO DE TRANSPORTE DE SEMENTES PARA DOSADOR DE SEMENTES," filed 23 Jan. 2019, the disclosure of each of which is incorporated, in its entirety, by this reference.

TECHNICAL FIELD

The present disclosure generally relates to agriculture. More specifically, some embodiments of the disclosure relate to devices and systems for seed capture, transport, and distribution for planting fields.

BACKGROUND

The demand for agricultural products has always been a determining element for the development and sustenance of the global human population. Such demand has increased over time because of global population growth. In order to serve the world market, farmers have increasingly invested in equipment and technological applications in agricultural implements that provide improved production of agricultural products and, consequently, bring greater income to the farmers.

When it comes to planting on large plots of land, agricultural implements called planters or seeders are generally used. Conventional planters are widely known and enable farmers to distribute the seeds in well-spaced rows and within an ideal depth range for improved germination of each crop.

Most crops have an ideal planting period within which optimal yields are obtained. For some crops, this period lasts approximately three weeks. Thus, one of the factors that significantly affect agricultural productivity is the speed of planting that meets the demand for an extensive land area over a relatively short period.

One of the problems farmers often encounter when using agricultural equipment for planting over large areas is difficulty in maintaining precision in seed distribution as planting speeds increase. More specifically, the seed distribution accuracy with optimal seed spacing may substantially decrease as the planter's travel speed increases, resulting in lower crop yields and thereby reduced profit for the farmers.

In some examples, the term "substantially" in reference to a given parameter, property, or condition may mean and include to a degree that one of ordinary skill in the art would understand that the given parameter, property, or condition is met with a small degree of variance, such as within acceptable manufacturing tolerances. By way of example, depending on the particular parameter, property, or condition that is substantially met, the parameter, property, or condition may be at least 90% met, at least 95% met, or even at least 99% met.

Systems using seed conveyors are known for planting seeds. For example, seed conveyers are described in patent documents U.S. Patent Application Publication No. 2010/0192819 and U.S. Patent Application Publication No. 2014/0230705. Systems using seed conveyors allow for higher planting speeds than conventional systems without seed conveyers. Conventional systems without seed conveyors usually transport seeds to the ground based only on gravity action through seed conductors, while attempting to maintain a high level of accuracy.

However, the known systems may still encounter problems in the transition between the seed meter and the seed transporter. For example, even in a set in which the seed meter performs its functions without errors, failures (e.g., missing seeds) or doubles (i.e., when two seeds are planted in place of one) can occur in the seed transition between the seed meter and the seed transporter, propagating the failure or double by the seed transporter to the soil distribution. Also, in some conditions of use, for example, with excess graphite and some types of seeds (e.g., corn that is flat and long), the conventional systems may not work properly.

Thus, conventional systems may have some drawbacks and limitations related to maintaining planting accuracy as increasingly higher speeds are demanded.

BRIEF SUMMARY

In order to overcome the inconveniences of conventional systems, embodiments of the present disclosure relate to seed capture devices for use with seed meters. In accordance with such embodiments, the seed capture device may include a movable element configured to capture seeds from a seed disk of a seed meter; and a power transmission element operably coupled to the movable element to drive the movable element when the seed meter is in operation and operably coupled to a mechanical contact element of the seed disk of the seed meter to drive the power transmission element when the seed meter is in operation.

According to additional or alternative embodiments of the disclosure, the following characteristics, alone or in technically possible combinations, may also be present: the power transmission element may be positioned and configured to receive mechanical energy from the seed disk and to transmit at least some of the mechanical energy to the movable element; the mechanical contact element may be positioned in a peripheral region of the seed disk; the power transmission element may include at least one of a belt, a chain, a gear, a rotary axle, a pulley, or a combination of at least two of the foregoing; the movable element may include at least one of a conveyor, a wheel, a belt, a lift, and/or another rotating element; the movable element may include a capturing element including at least one of fins, bristles, teeth, claws, forceps, pinchers, grabbers, and resilient surfaces; the seed capture device may be supported by the seed meter may be operably coupled to a seed transport element to pass seeds from the seed disk to the seed transport element when the seed meter is in operation, wherein the seed transport element may be configured to transport seeds from the seed capture device to soil for planting; the seed capture device may include an auxiliary element adjacent to the movable element, wherein the auxiliary element is positioned and configured to guide seeds from the movable element to the seed transport element; the auxiliary element may be movable or fixed relative to the seed meter; the seed transport element may include a seed conveyer or a seed conductor; movement of the movable element may be synchronized with movement of the seed disk; and/or the seed capture device and the seed disk may be coupled to each other to form a single assembly that is removable and replaceable as a whole in the seed meter.

In additional embodiments, the present disclosure may also include a system for seed singulation and dispensation that may include: a seed meter equipped with a seed disk; a seed capture device configured to capture seeds from the seed disk; and a seed transport element configured to transport seeds from the seed capture device to soil for planting, wherein the seed capture device may be operably coupled to the seed disk the seed transport element may be positioned adjacent to the seed capture device.

According to additional or alternative embodiments of the disclosure, the following characteristics, alone or in technically possible combinations, may also be present: the seed capture device may be coupled to the seed disk with a ring at least substantially encompassing a peripheral region of the seed disk or with an arc assembly that partially encompasses the peripheral region of the seed disk; the seed capture device and the seed disk form are coupled to each other to form an assembly that is removable and replaceable in the seed meter as a whole; and/or the seed disk may be configured to move seeds in seed holes thereof at a first speed, the seed capture device may be configured to move seeds at a second speed higher than the first speed, and the seed transport element may be configured to move seeds at a third speed higher than the second speed.

In further embodiments, the present disclosure also includes another system of seed singulation and dispensation that may include a seed meter including a seed disk; a seed capture device for capturing seeds from the seed disk; a seed transport element for transporting seeds from the seed capture device to soil for planting; and a seed accelerator positioned and configured to accelerate seeds from at least one of the seed disk, the seed capture device, or the seed transport element.

According to additional or alternative embodiments of the present disclosure, the following characteristics, alone or in technically possible combinations, may also be present: the seed accelerator may include a wheel that is positioned adjacent to the seed disk; the seed accelerator may be coupled to the seed transport element; and/or the seed accelerator may be coupled to the seed transport element in a position to accelerate seeds as the seeds exit the seed transport element and proceed toward the soil.

In additional embodiments, the present disclosure includes a seed transport synchronization system for a seed meter that may include: a seed transport element configured to transport seeds from a seed disk of a seed meter toward soil for planting, wherein the seed disk includes a plurality of seed holes radially spaced around a rotational axis of the seed disk; and a synchronization element configured to synchronize movement of the seed transport element with rotational movement of the seed disk.

According to additional or alternative embodiments of the present disclosure, the following characteristics, alone or in technically possible combinations, may also be present: the synchronization element may include at least a first sensor for detecting an operating parameter of the seed disk and a second sensor for detecting an operating parameter of the seed transport element; the operating parameters of the seed disk and of the seed transport element may include at least one of from speed, position, distance relative to a predetermined reference point, or combinations thereof; each of the first sensor and the second sensor may include at least one of an optical sensor, a magnetic sensor, an ultrasonic sensor, or a mechanical sensor; the seed disk may be configured to be driven by a first energy source and the seed transport element may be configured to be driven by a second, independent energy source; and/or each of the first energy source and the second energy source may include at least one of an electric motor, a hydraulic motor, or mechanical energy obtained from the rotation a wheel in contact with the soil.

BRIEF DESCRIPTION OF THE DRAWINGS

The accompanying drawings illustrate a number of example embodiments and are a part of the specification. Together with the following description, these drawings demonstrate and explain various principles, potential advantages, and potential technical and functional improvements of the present disclosure.

Figure 1:
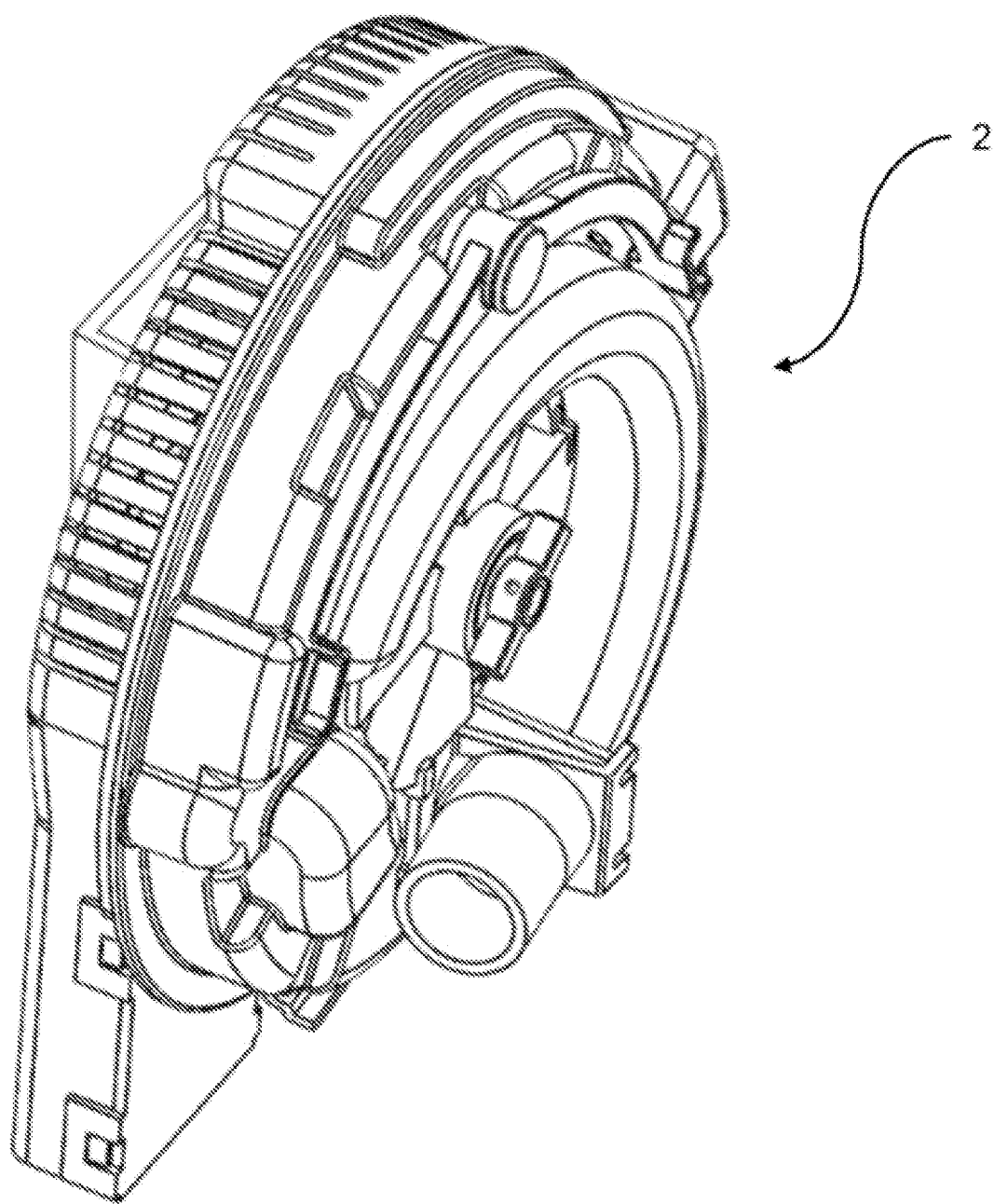
FIG. 1 shows a seed meter, according to at least one embodiment of the present disclosure.

Throughout the drawings, identical or similar reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

Embodiments of the present disclosure will now be described with reference to the accompanying figures. The figures are not necessarily drawn to scale; that is, certain features of the present disclosure may be shown to be exaggerated or in some schematic manner, and details of conventional elements may not be shown in order to illustrate certain embodiments more clearly and concisely. The present disclosure is susceptible to implementation in different ways. Specific embodiments are described in detail and shown in the figures, with the understanding that the description should be considered as an exemplification of the principles disclosed herein. Thus, the present disclosure is not intended to be limited to what is illustrated and described in this specification. It should be recognized that the different particular elements of the embodiments discussed below may be employed separately or in any suitable combination to produce the same or similar technical effects.

The present disclosure will be described below in reference to a pneumatic seed meter 2, as shown in FIG. 1. The form of the seed meter 2 is illustrated by way of non-limiting example, with the understanding that seed meters can also be employed with mechanics of honey-combed disks, finger-pickups, and other types.

Figure 2:
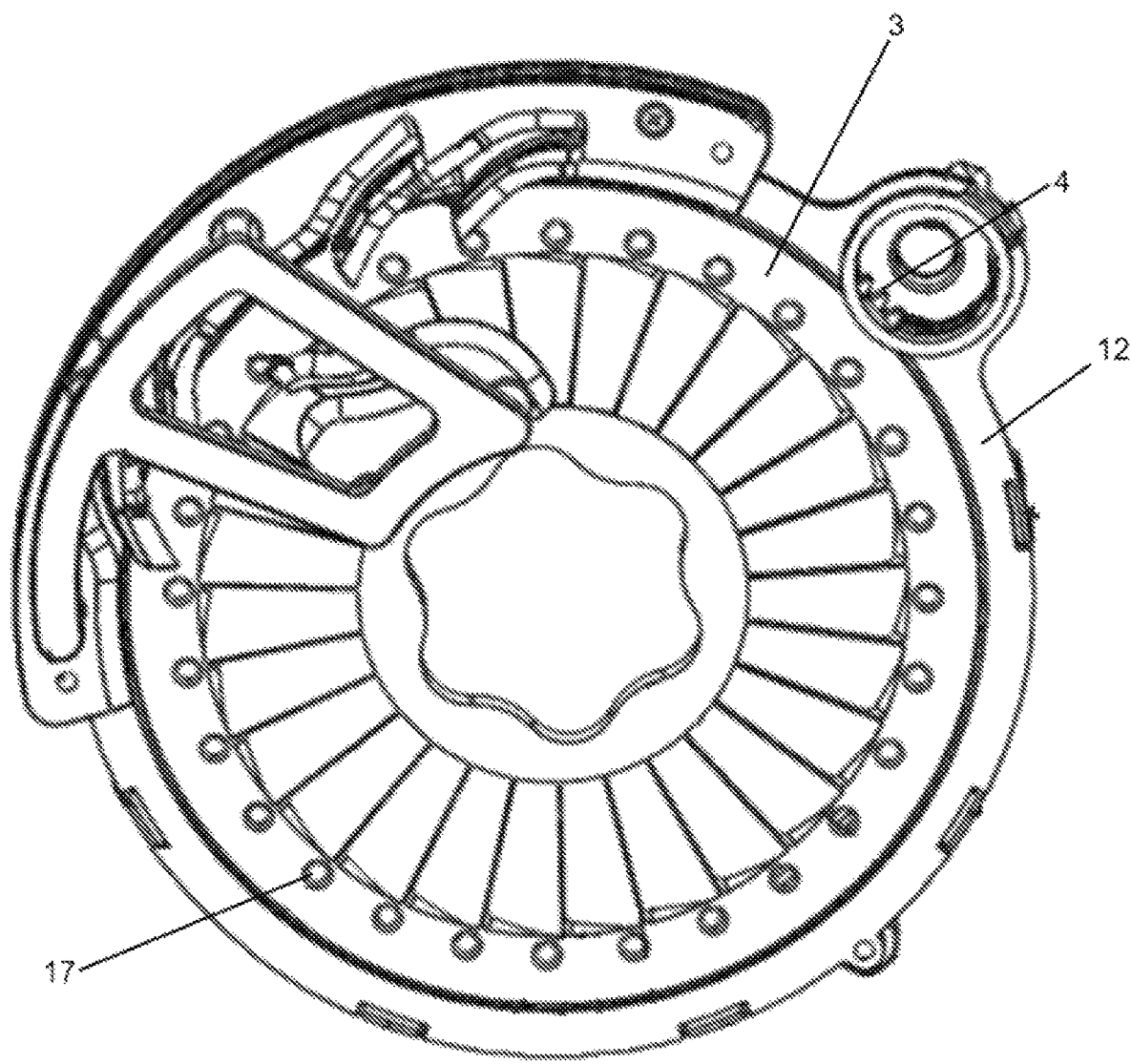
FIG. 2 shows a front view of a seed disk with a ring, according to at least one embodiment of the present disclosure.
Figure 3:
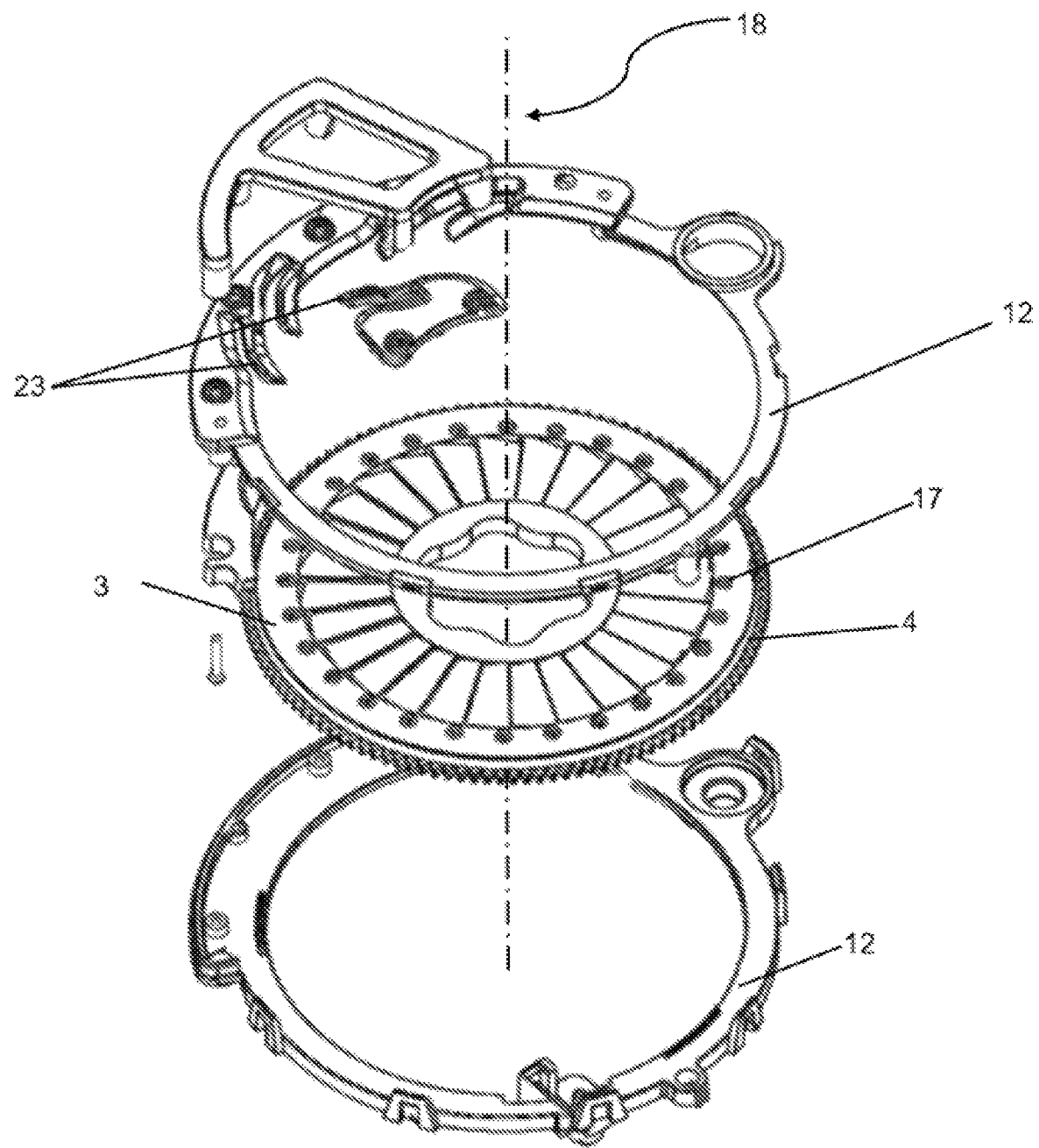
FIG. 3 shows an exploded view of the seed disk and ring assembly of FIG. 2.
Figure 4:
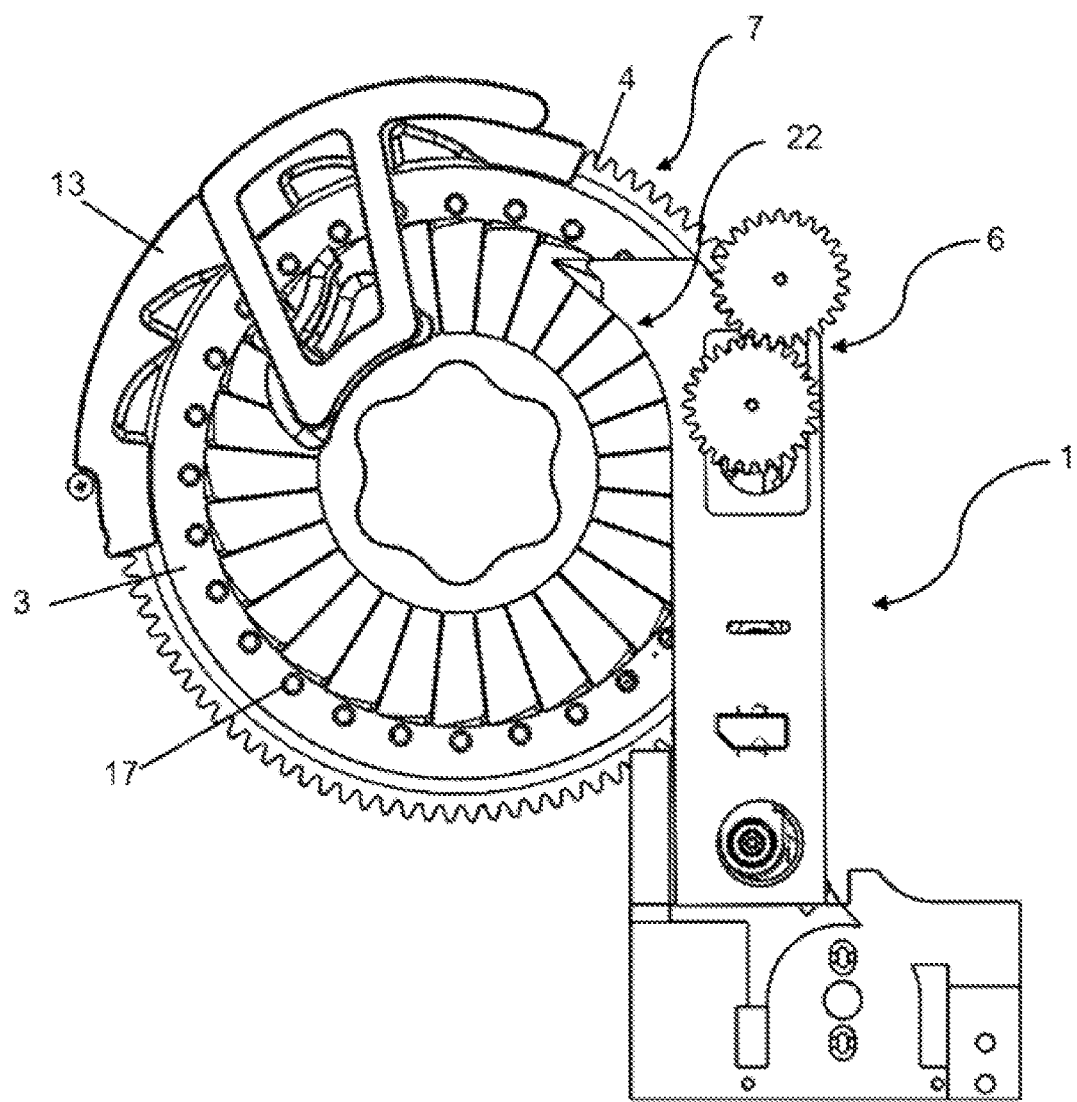
FIG. 4 shows a front view of a seed capture device associated with a seed disk, according to at least one embodiment of the present disclosure.

Also in a non-limited way, the seed disks 3 will be described and illustrated according to example embodiments. However, the dimensions, the number of holes, and other ornamental and technical details are given only to facilitate understanding and may not affect the general principles of operation of embodiments of the present disclosure. FIGS. 2, 3, and 4 illustrate in greater detail the characteristics of the seed disk 3, but the same seed disk 3 is illustrated in other drawings with less prominence.

In one embodiment, as shown in the front view of FIG. 2 and in the exploded perspective view of FIG. 3, singulators 23 are associated with (e.g., held in a predetermined position relative to) the seed disk 3 by a ring 12. The ring 12 may at least substantially encompass a peripheral region 7 of the seed disk 3. The ring 12, singulators 23, and seed disk 3 may be coupled together to form an assembly that may be installed in and removed from the seed meter 2 as a whole. The seed disk 3 may be rotatable relative to the ring 12 and singulators 23.

As illustrated in FIGS. 2 and 3 the seed disk 3 may include seed holes 17 that may be spaced equidistant from each other and that may be positioned the same radial distance from a rotational axis 18 (FIG. 3) of the seed disk 3, forming a single row of seed holes 17 to result in a common trajectory of the seeds during the singulation. In additional embodiments, the seed holes 17 may be positioned in two or more radial rows.

In addition, FIGS. 2 and 3 also illustrate a mechanical contact element 4 of the seed disk 3. The mechanical contact element 4 of seed disk 3 is illustrated in FIGS. 2 and 3 as gear teeth along the peripheral region 7 (e.g., along an edge) of the seed disk 3

Although the mechanical contact element 4 is illustrated in the form of gear teeth on the edge of the seed disk 3, the present disclosure is not so limited. For example, in additional embodiments, the mechanical contact element 4 may include any element that is configured to allow energy transmission from the rotating movement of the seed disk 3 to another element or mechanism. For example, the mechanical contact element may include one or more recesses, protrusions, other surface patterns, and/or a smooth surface, which can also be used to achieve the same effect of energy transmission, as will be explained further below.

Additionally, the mechanical contact element 4 may be in different locations on the seed disk 3 and need not be exactly on the edge of the seed disk 3. For example, in additional embodiments the mechanical contact element 4 can be arranged on the top and/or bottom surface of the seed disk 3.

FIG. 4 shows an arc assembly 13, which is an alternative to the ring 12 (FIGS. 2 and 3) for operably coupling the singulators 23 to the seed disk 3. The arc assembly 13 may encompass only a part of the peripheral region 7 of the seed disk 3 and may use a rail system (e.g., a protrusion on the arc assembly 13 and a complementary recess on the seed disk 3, or vice versa) to keep the arc assembly 13 attached to the seed disk 3.

Also shown in FIG. 4 is an embodiment of a seed capture device 1, according to at least one embodiment of the present disclosure. As can be observed in FIG. 4, a power transmission element 6 may be operably coupled to the mechanical contact element 4 of the seed disk 3 to receive mechanical energy from the rotational movement of the seed disk 3 to activate the seed capture device 1.

Figure 5:
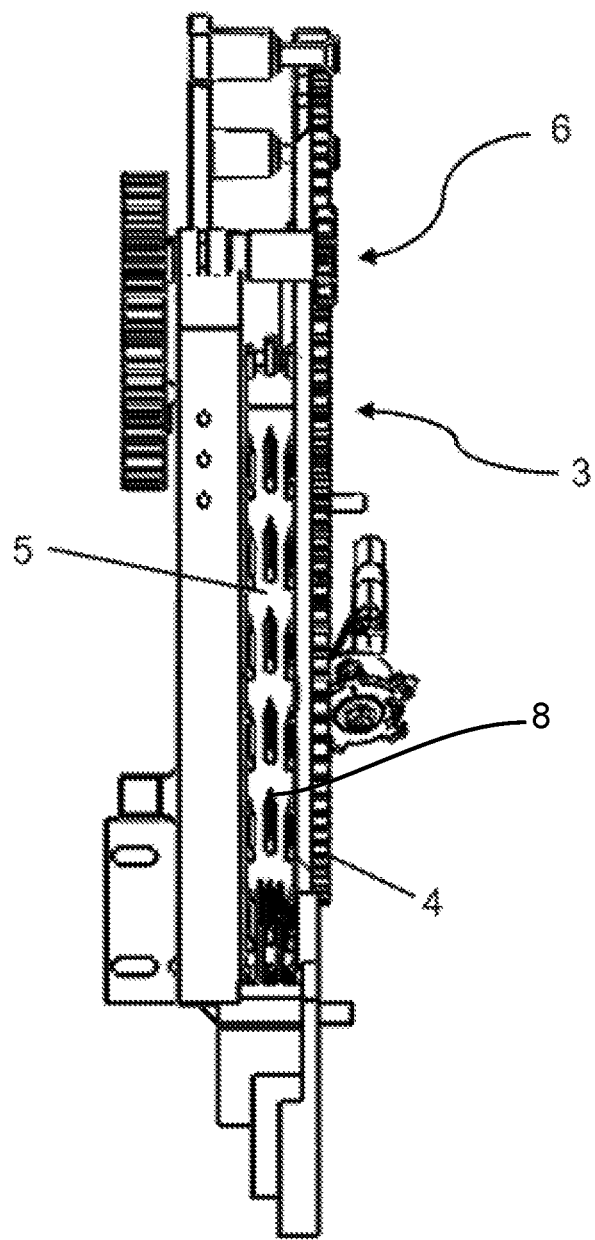
FIG. 5 shows a side view of the assembly of FIG. 4.
Figure 6:
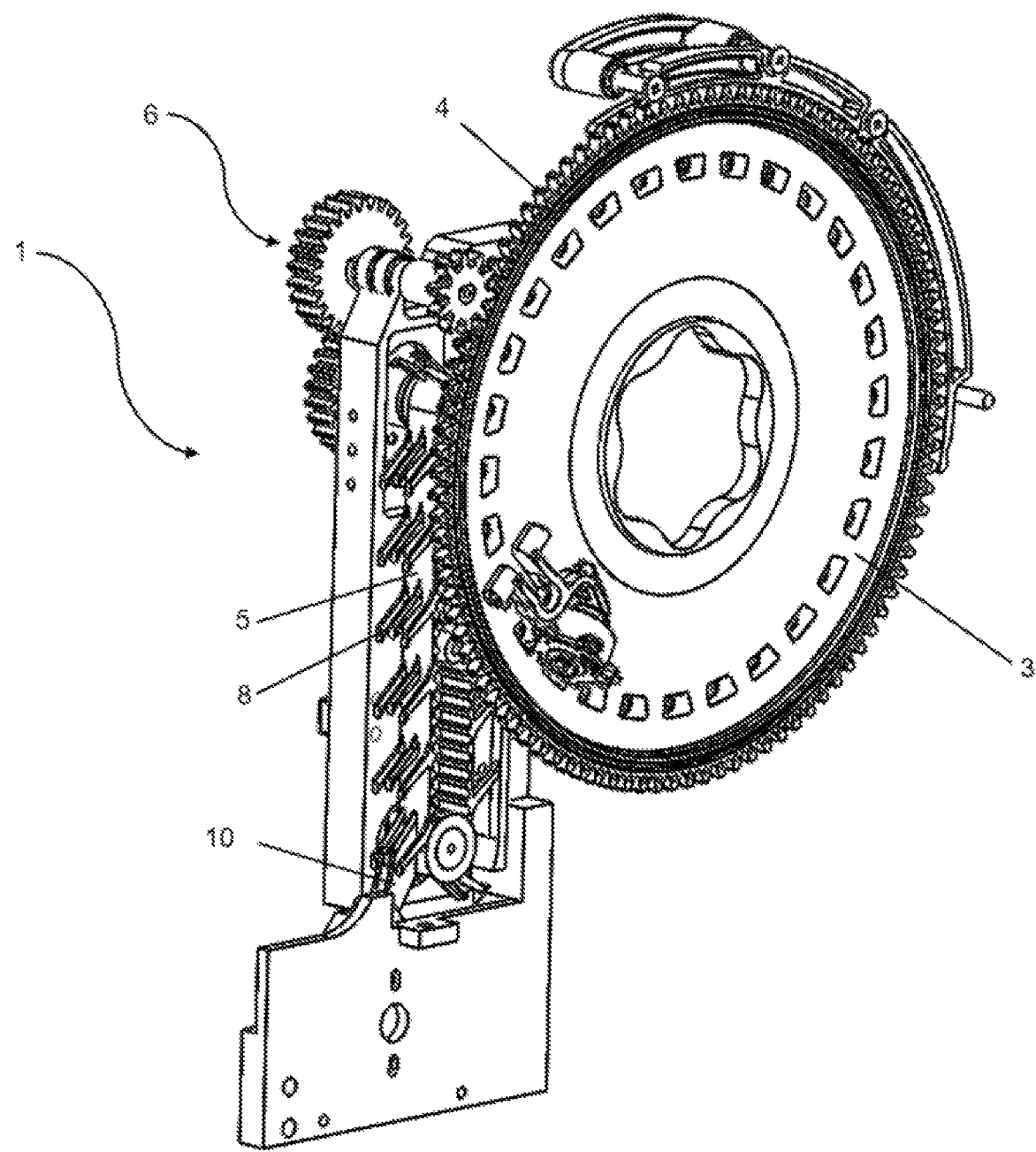
FIG. 6 shows a rear perspective view of the assembly of FIG. 4.
Figure 7:
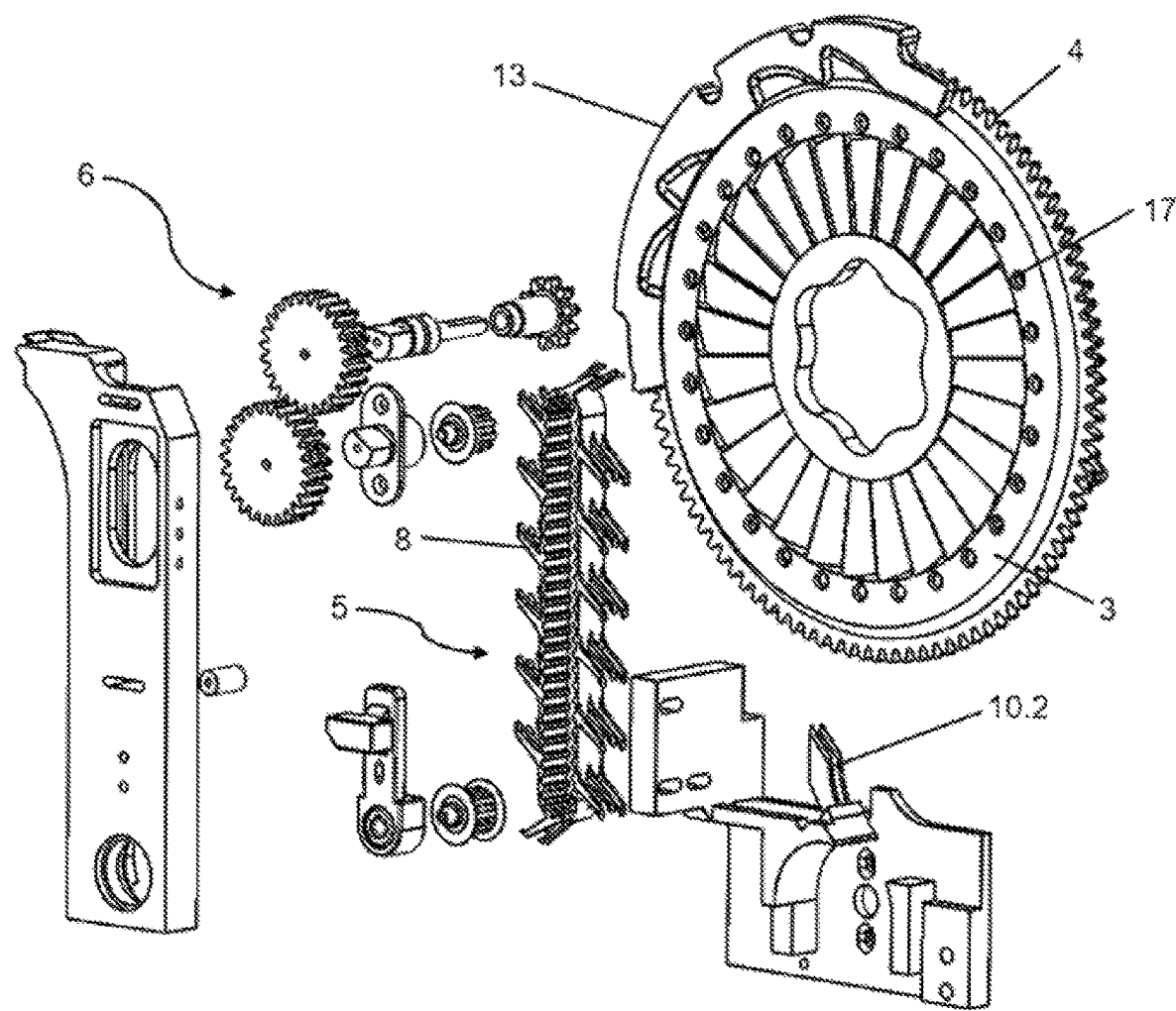
FIG. 7 shows an exploded view of the assembly of FIG. 4.

More specifically, the energy captured by the power transmission element 6 may be used to drive a movable element 5 of the seed capture device 1, as illustrated in FIGS. 5, 6, and 7.

FIGS. 6 and 7 show in more detail an embodiment of a power transmission element 6 of the seed capture device 1. The power transmission element 6 may include gears. However, other forms of the power transmission element 6 may also be employed, such as belts, chains, rotary axis, pulleys, and/or any suitable combination of these and/or in combination with one or more gears.

The form of the power transmission element 6 may be selected based on the form of the mechanical contact element 4 of the seed disk 3, since these two elements may be operably coupled with each other to form a drive mechanism of the seed capture device 1.

In some embodiments, the seed capture device 1 may include a seed orientation wall 22 positioned to be prior to a seed capture region (e.g., where the seed capture device 1 captures seeds) as illustrated by way of example in FIG. 4. The orientation wall 22 may be arranged adjacent to (e.g., radially within) the trajectory of the plurality of seed holes 17 to touch at least some of the seeds (e.g., mis-oriented seeds) and provide an improved orientation of the seeds in the seed holes 17 for seed capture by the seed capture device 1.

FIGS. 5, 6, and 7 show an example embodiment of the movable element 5 of the seed capture device. As illustrated in FIGS. 5, 6, and 7, the movable element 5 may include a belt with spaced bristle capture elements 8 protruding from the belt.

Although the movable element 5 is illustrated in FIGS. 5, 6, and 7 in a belt configuration, it should be understood that alternative configurations are also included in the present disclosure. For example, the movable element 5 may include a wheel, conveyor, elevator, or another movable element alone or in combination in additional embodiments of the present disclosure to achieve the same or a similar technical effect.

In one embodiment of the disclosure, the capture element 8 may be in the form of bristles arranged three by three in spaced rows to form a free space between the rows of bristles for receiving the captured seeds. In additional embodiments, the capture element 8 may have other arrangements of bristles or other elements such as fins, teeth, claws, forceps, pinchers, grabbers, and resilient surfaces.

In general, the present disclosure also includes embodiments of an auxiliary element 10 configured to assist in the transition of seeds as they exit the seed capture device 1 to be directed to a seed transport element 9.

Figure 8:
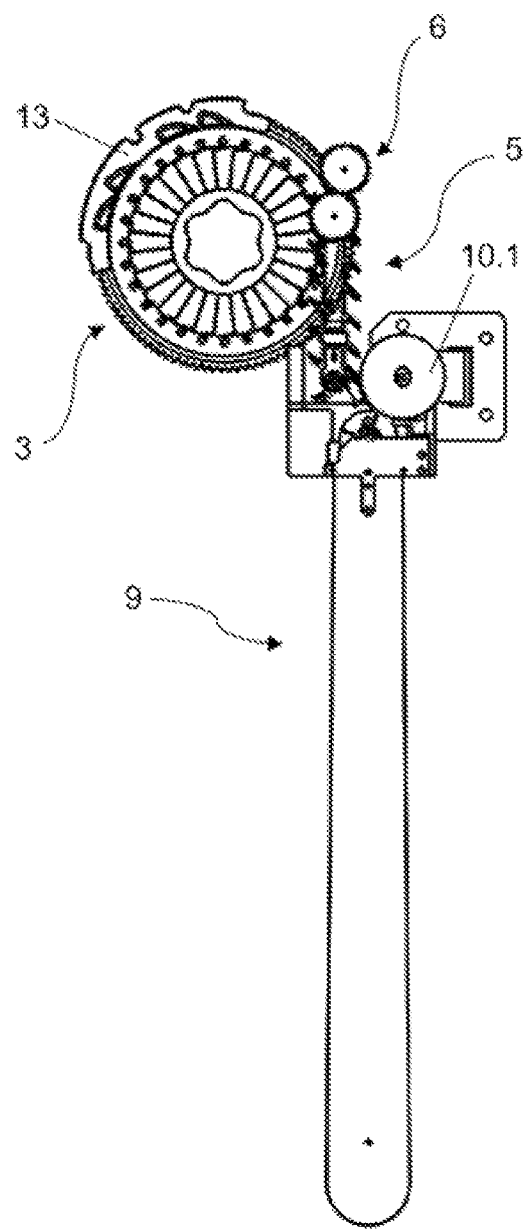
FIG. 8 shows a front view of a seed capture device associated with a seed disk and a seed transporter, according to at least one embodiment of the present disclosure.
Figure 9:
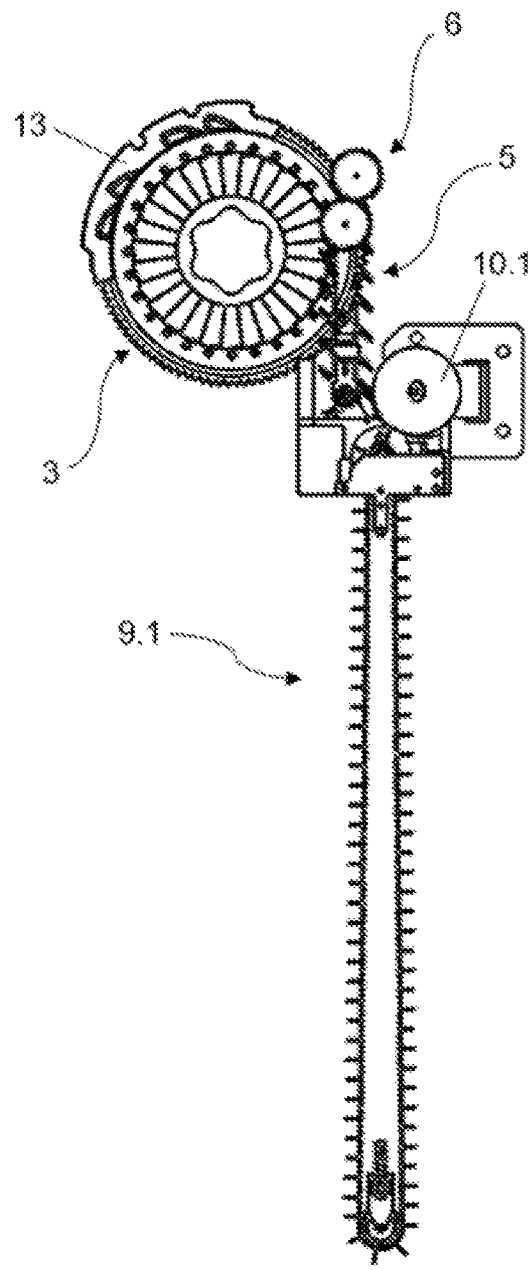
FIG. 9 shows FIG. 8 with the inside of the seed transporter showing.
Figure 10:
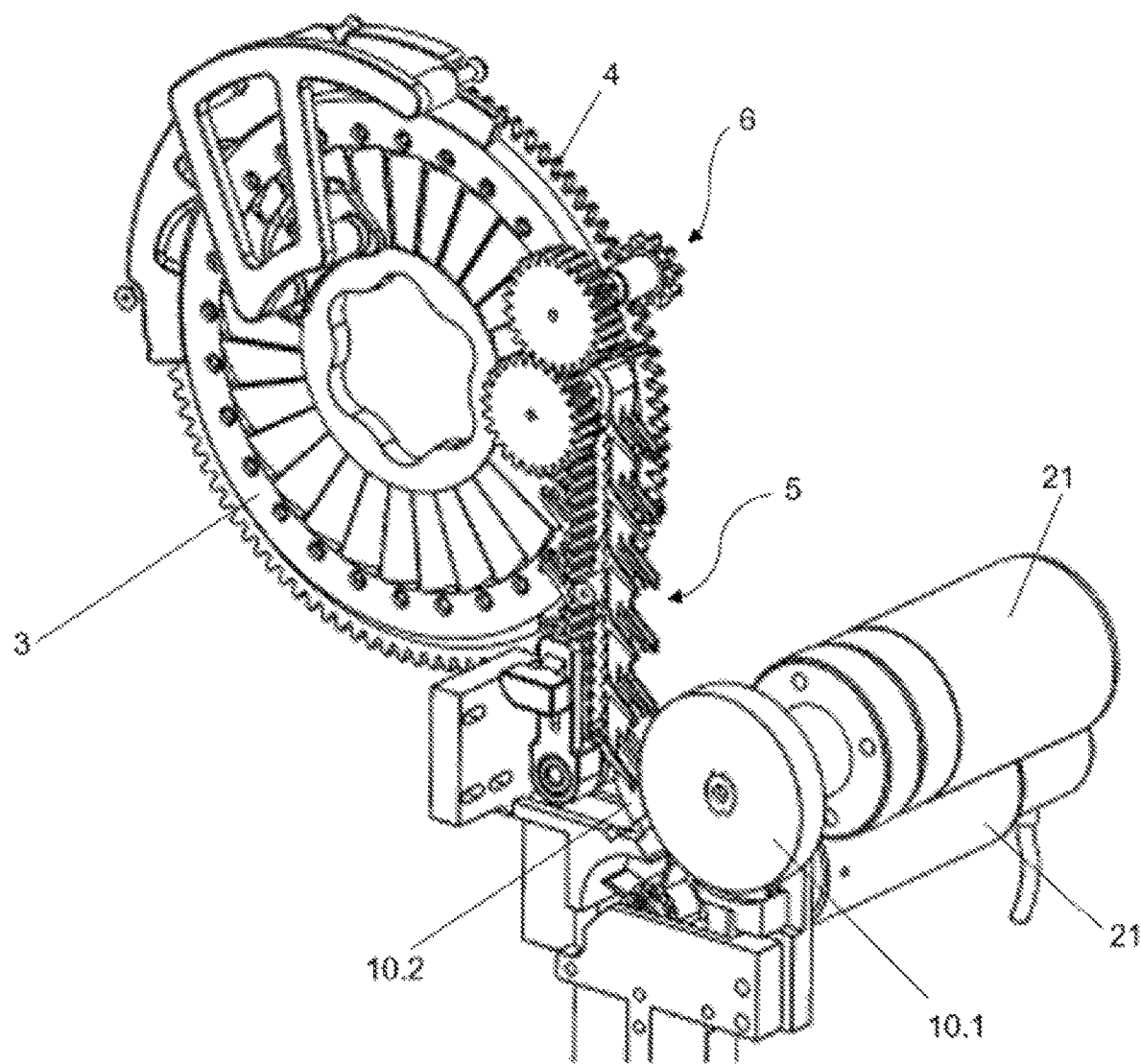
FIG. 10 shows an amplified perspective view of the assembly of FIG. 8.
Figure 11:
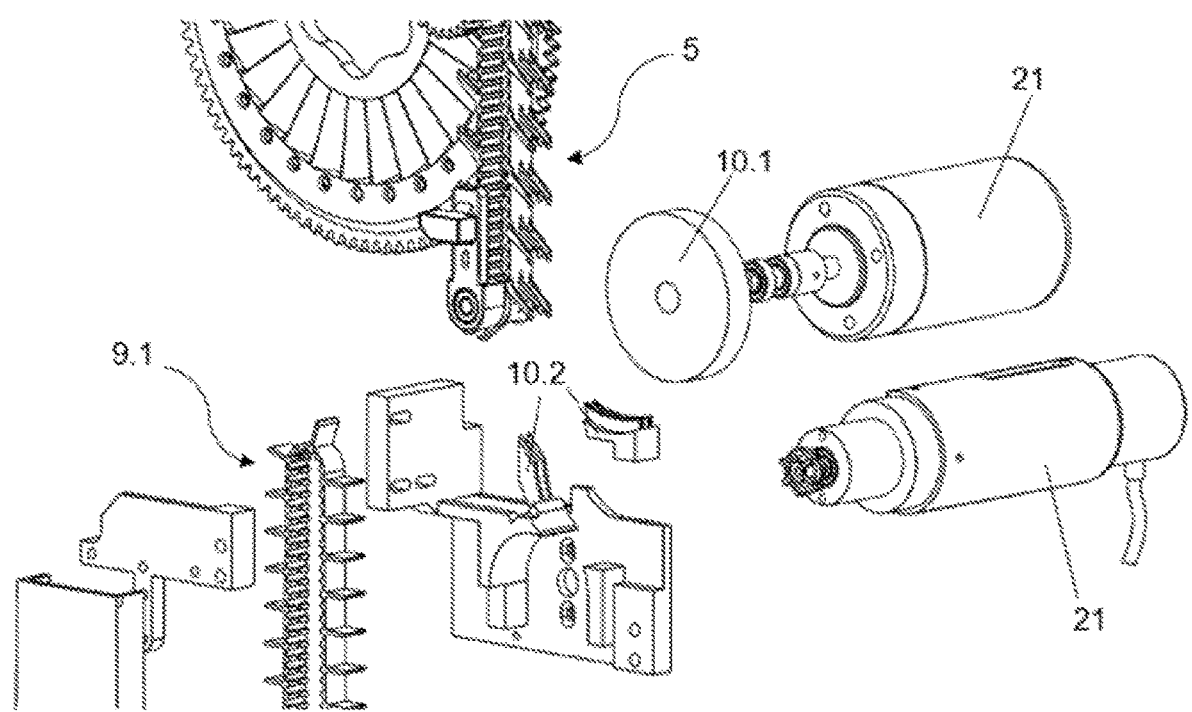
FIG. 11 shows an exploded view of the assembly of FIG. 10.

In some embodiments, the auxiliary element 10 may be a fixed auxiliary element 10.2, as illustrated in FIG. 7, which may be fixed relative to the seed meter 2. In this configuration, the fixed auxiliary element 10.2 may include two rigid plates configured and positioned in spaces between the capture elements 8 of the movable element 5. In this arrangement, the seeds may be transported from the seed capture device 1 to the seed transport element 9 as the seeds are directed upwards into the spaces between the capture elements 8 and out of the seed capture device 1 towards the seed transport element 9, which would be positioned adjacent to (e.g., below) the seed capture device 1 when fully assembled (see, e.g., FIGS. 8, 9, and 12).

In additional embodiments of the present disclosure, the auxiliary element 10 may be or include a movable auxiliary element 10.1. The movable auxiliary element 10.1 is illustrated in FIGS. 8, 9, 10, and 11 as a rotating wheel. The movable auxiliary element 10.1 may be driven by an independent (e.g., relative to the seed disk and/or the movable element 5 of the seed capture device 1) energy source. In additional embodiments, the movable auxiliary element 10.1 may be driven by a belt, conveyor, or other movable element driven by gears or other forms associated with the movable element 5 and/or the mechanical contact element 4 of the seed disk 3.

The present disclosure further provides that movement of the seed capture device 1, seed disk 3, and seed transport element 9 may be synchronized with each other. In some embodiments, the movement of the seed capture device 1, seed disk 3, and seed transport element 9 may be synchronized, but at different speeds. For example, the seed meter 2 may maintain an adequate speed for seed singulation and the seed capture device 1 can be configured for movement at a higher speed that enables seed transition from the seed meter 2 to the seed transport element 9, which in turn can reach higher speeds to suit the associated planter's travel speed. Thus, in some embodiments, the seed disk 3 may be configured to move seeds in the seed holes 17 at a first speed, the seed capture device 1 may be configured to move seeds at a second speed higher than the first speed, and the seed transport element 9 may be configured to move seeds at a third speed higher than the second speed.

In FIGS. 9, 10, 11, and 12, the seed transport element 9 is illustrated as a seed conveyer 9.1. The illustrated seed conveyer 9.1 may include a conveyor belt with protrusions. Alternatively or additionally, bristles, teeth, claws, fins, pinchers, and other graspers that maintain the seeds at predetermined intervals can be used.

In some embodiments, the seed capture device 1 may be positioned on one side of the seed meter 2 by being coupled to the seed disk 3. Additionally or alternatively, the seed capture device 1 may be coupled to the seed transport element 9. In such embodiments, installation and maintenance of the seed capture device 1 may be facilitated since the seed capture device 1 may be removable from the seed meter 2 independently from the seed disk 3.

Figure 12:
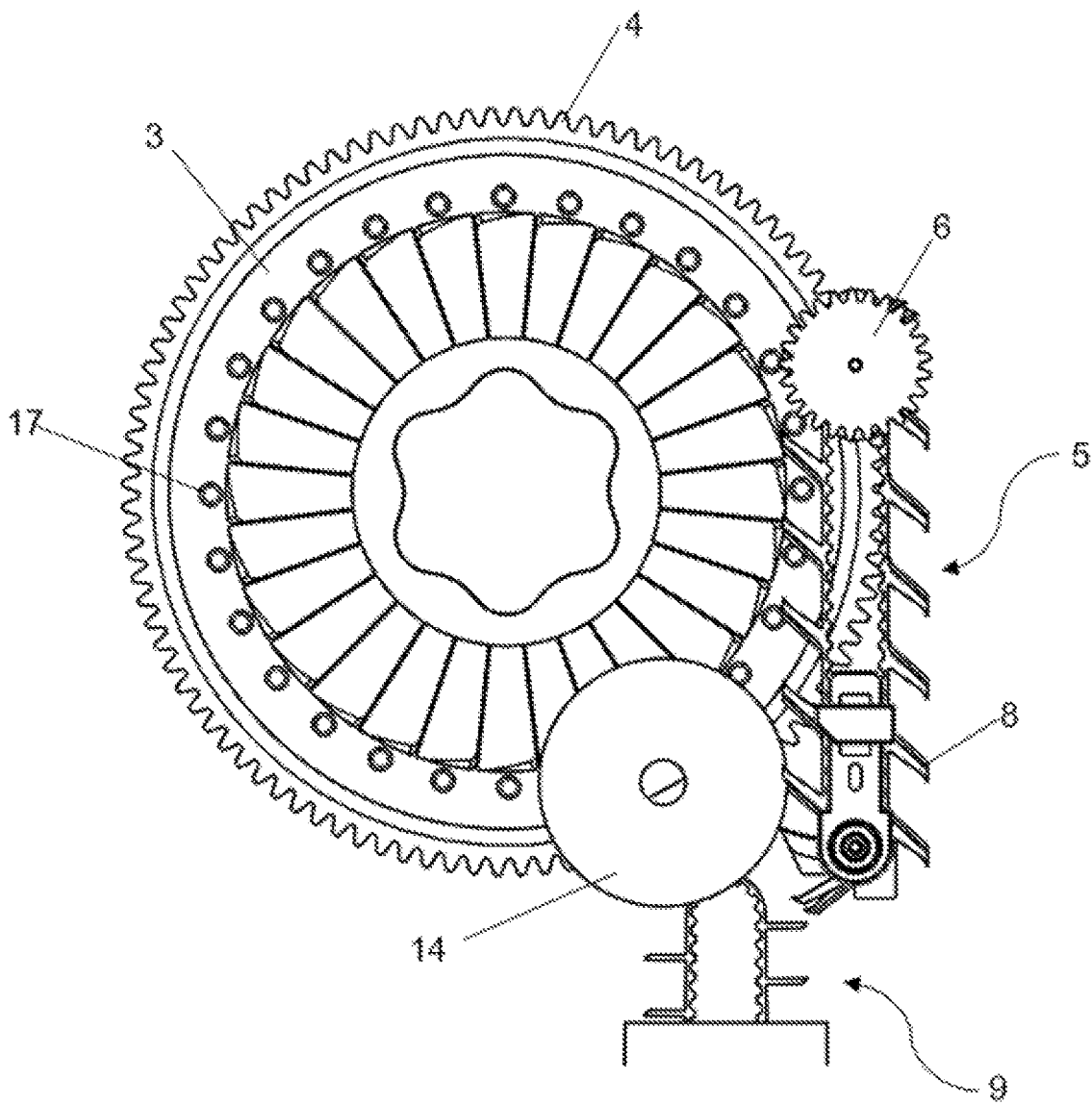
FIG. 12 shows a front view of an assembly, according to at least one embodiment of the present disclosure.
Figure 13:
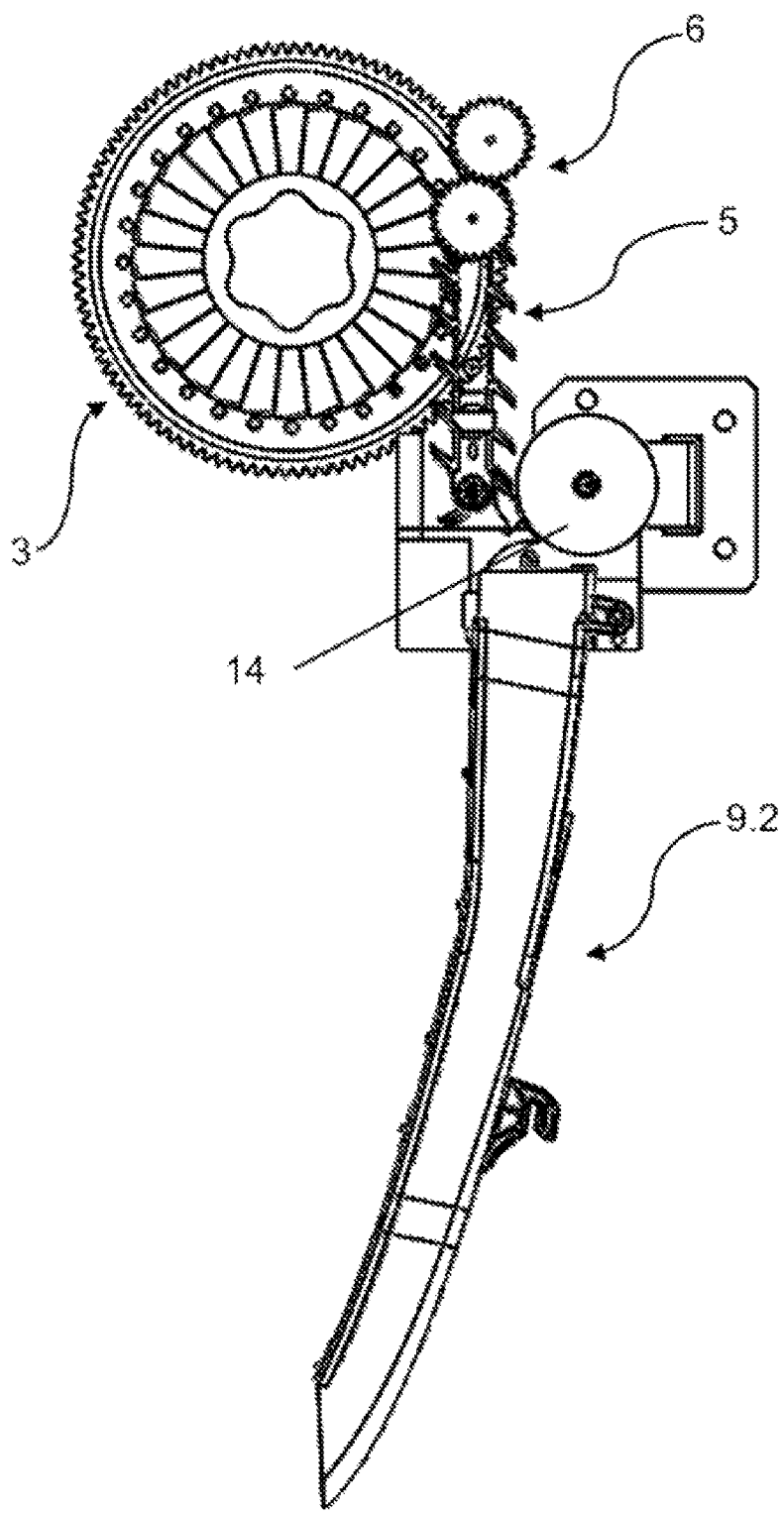
FIG. 13 shows a front view of an assembly, according to at least one additional embodiment of the present disclosure.
Figure 14:
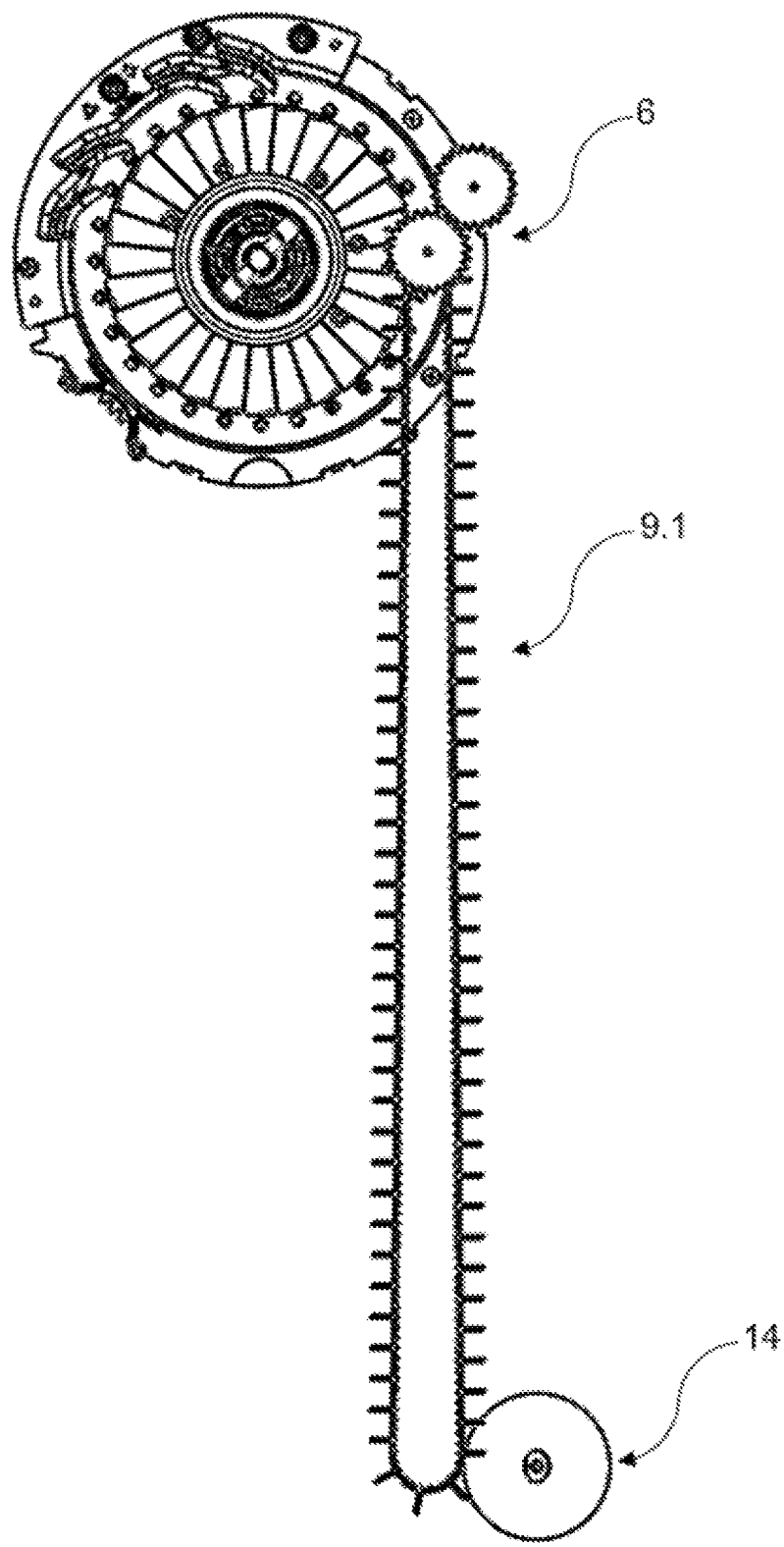
FIG. 14 shows a front view of an assembly, according to at least one other embodiment of the present disclosure.

In other embodiments, a seed accelerator 14 configured to accelerate the seeds adjacent to the seed meter 2 and/or seed transport element 9 may be included, as illustrated in FIGS. 12, 13, and 14.

FIG. 12 illustrates an embodiment in which the seed accelerator 14 is positioned adjacent to the seed meter 2 (e.g., adjacent to the seed disk 3 of the seed meter 2) to enable the seed capture device 1 to capture the seeds at a higher speed than the seed disk 3 moves the seeds.

FIG. 13 illustrates another embodiment wherein the seed transport element 9 is a seed conductor 9.2. For example, the seed conductor 9.2 may be in the form of a tube for conducting seeds from the movable element 5 of the seed capture device 1 to soil for planting. In this configuration, the seed accelerator 14 may be positioned at an entrance of conductor 9.2 and may be used to control the speed that the seed will be released through the conductor 9.2 to the soil. The speed of the seed accelerator 14 may be adjusted according to the speed of a planter carrying the illustrated elements.

FIG. 14 illustrates another embodiment of the present disclosure in which the seed transport element 9 may be a seed conveyer 9.1. In this configuration, the seed conveyer 9.1 may capture seeds directly (e.g., without a separate seed capture device 1) from the seed disk 3 and may transport the seeds to a seed accelerator 14 positioned at an exit of the seed conveyer 9.1. The seed accelerator may control the speed at which seeds will be released from the seed conveyer 9.1 directly to the soil according to the corresponding planter speed.

Figure 15:
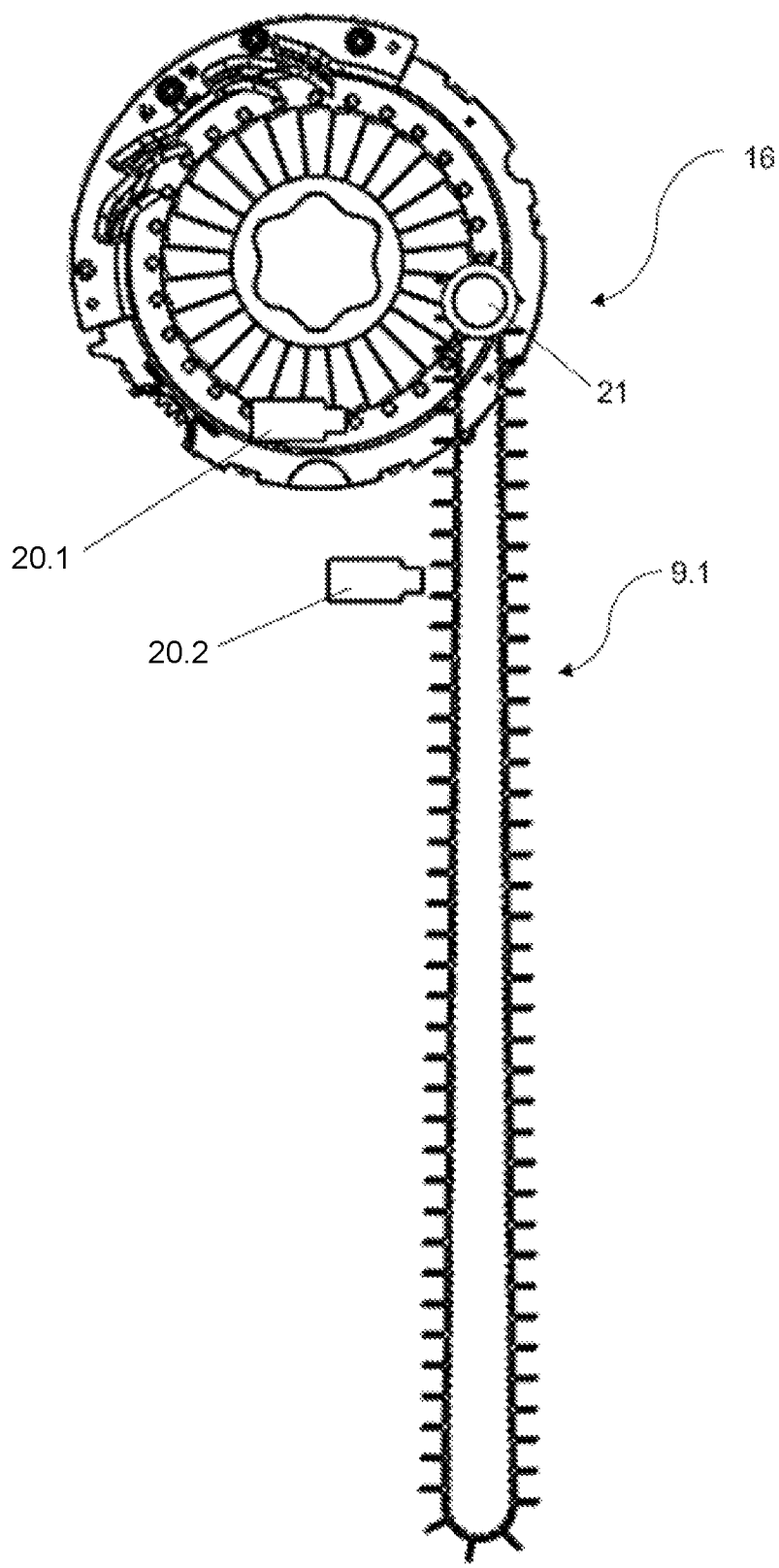
FIG. 15 shows a front view of an assembly, according to at least one further embodiment of the present disclosure.
Figure 16:
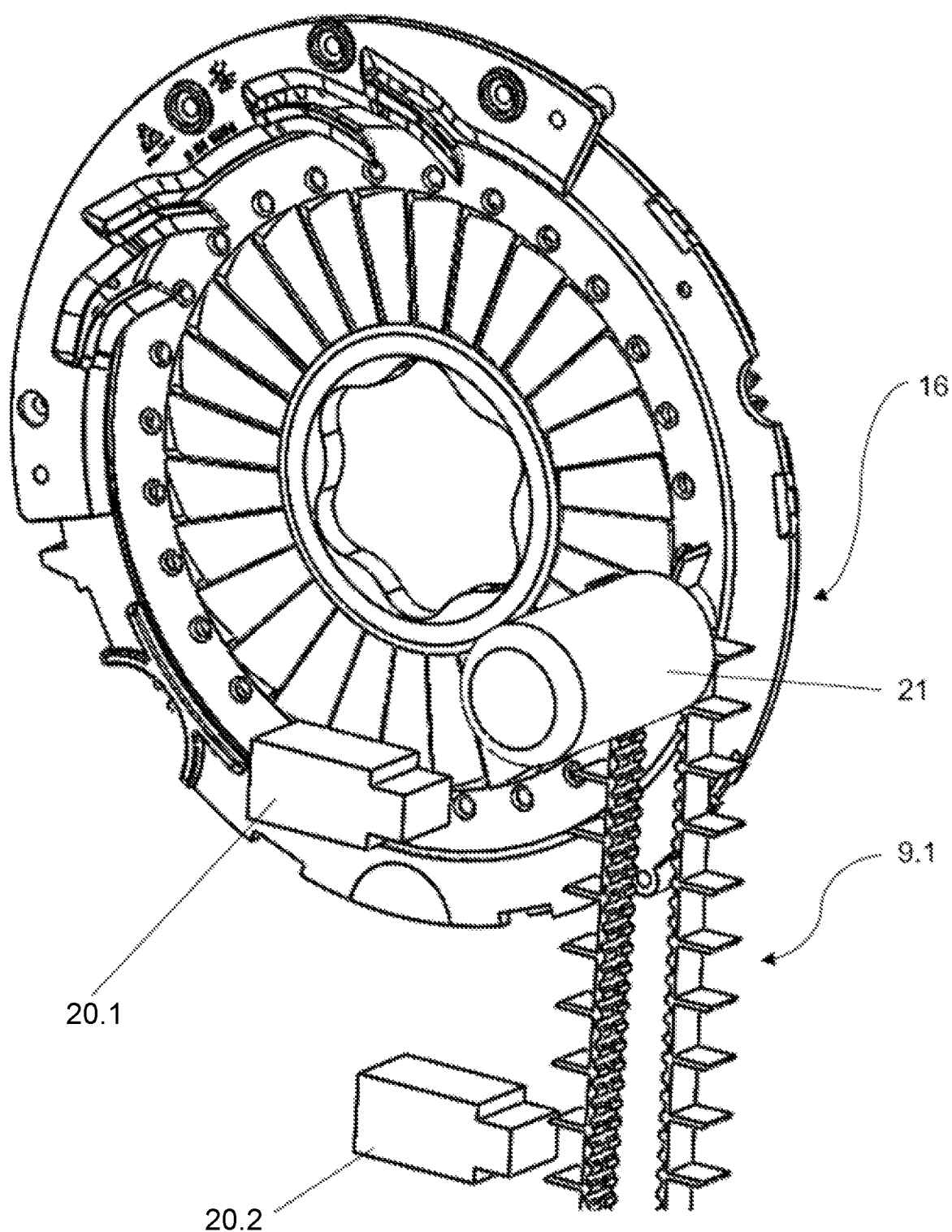
FIG. 16 shows an amplified perspective view of FIG. 15.

As shown in FIGS. 15 and 16, the present disclosure also includes a synchronization system 16 that may be configured to synchronize movement of the seed transport element 9 and the seed meter 2. For example, the synchronization system 16 may synchronize movement of the seed conveyer 9.1 with respect to the rotational movement of the seed disk 3 of the seed meter 2.

FIGS. 15 and 16 show an embodiment of the synchronization system 16 of the present disclosure in which two sensors 20.1 and 20.2 are used to facilitate synchronization. A first sensor 20.1 may be positioned adjacent to the seed disk 3 to detect an operating parameter of the seed disk 3 and a second sensor 20.2 may be positioned adjacent to the seed conveyer 9.1 to detect an operating parameter of the seed conveyer 9.1.

The operating parameters of both the seed disk 3 and the seed conveyer 9.1 that may be detected by the sensors 20.1 and 20.2 may include at least one of velocity, position, and relative distance from a predetermined reference point.

In some embodiments, the synchronization system 16 may employ independent energy sources for respectively driving the seed disk 3 and the seed conveyer 9.1, so that it is possible to drive the seed conveyer 9.1 to adjust the position between the spaces of the seed conveyer 9.1 (e.g., the spaces between protrusions on the seed conveyer 9.1) relative to the holes of the seed disk 3 while maintaining an appropriate speed of the seed conveyer 9.1 for delivering the seeds to the soil while compensating for the speed of the planter.

For example, the synchronism system 16 of the present disclosure may allow the speed of the seed conveyer 9.1 to be controlled so that, if the speed of the seed conveyer 9.1 is greater than the rotational speed of the seed disk 3, the seed conveyer 9.1 can compensate the rotation to always coincide a seed hole 17 of the seed disk 3 with a space of the seed conveyer 9.1. For example, one or more of the spaces of the seed conveyer 9.1 may be skipped (e.g., without placing a seed therein), and/or the speed of the seed conveyer 9.1 may be accelerated or decelerated to inhibit the protrusions thereof from pushing the seeds back inside the seed meter 2.

In view of the above, embodiments of the present disclosure may provide a seed capture device for an agricultural implement that may be capable of eliminating or reducing some limitations of conventional technologies.

Another advantage of certain embodiments of the present disclosure may be to provide a seed capture element that may be driven by being operably coupled with a seed meter, such as by using the mechanical rotation energy of a seed disk of the meter seed.

In addition, embodiments of the present disclosure may include a synchronization system that may be configured to synchronize the speed of the seed disk with the speed of a seed transport element for transporting seeds to soil for planting.

In addition, some embodiments of the present disclosure include a seed accelerator to adjust the speed of seed transport, such as to correspond to a travel speed of an associated agricultural implement (e.g., a planter).

In additional embodiments, the present disclosure may also include a seed capture element that may be positioned to move seeds from a seed disk of a seed meter disk to a seed transporter configured to transport seeds to soil for planting.

Although the present disclosure has been specifically described with respect to particular embodiments, it should be understood that variations and modifications will be apparent to those skilled in the art and may be made without departing from the scope of protection of the present disclosure. Accordingly, the scope of protection is not limited to the embodiments described, but is limited only by the appended claims, the scope of which must include all equivalents.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A seed transport synchronization system for a seed meter, comprising:
    a seed transport element configured to transport seeds from a seed disk of a seed meter toward soil for planting, wherein the seed disk comprises a plurality of seed holes radially spaced around a rotational axis of the seed disk; and
    a synchronization element configured to electronically synchronize movement of the seed transport element with rotational movement of the seed disk, wherein the synchronization element comprises at least a first sensor for detecting an operating parameter of the seed disk and a second sensor for detecting an operating parameter of the seed transport element.

2. The system of claim 1, wherein the operating parameters of the seed disk and of the seed transport element comprise at least one of speed, position, distance relative to a predetermined reference point, or combinations thereof.

3. The system of claim 1, wherein each of the first sensor and the second sensor comprises at least one of an optical sensor, a magnetic sensor, an ultrasonic sensor, or a mechanical sensor.

4. The system of claim 1, wherein the seed disk is configured to be driven by a first energy source and the seed transport element is configured to be driven by a second, independent energy source.

5. The system of claim 4, wherein each of the first energy source and the second energy source comprises at least one of an electric motor, a hydraulic motor, or mechanical energy obtained from rotation of a wheel in contact with the soil.

* * * * *